March 10, 1931.  W. B. HILL  1,795,488
MEANS FOR ERADICATING INSECTS
Filed Aug. 26, 1929  2 Sheets-Sheet 1
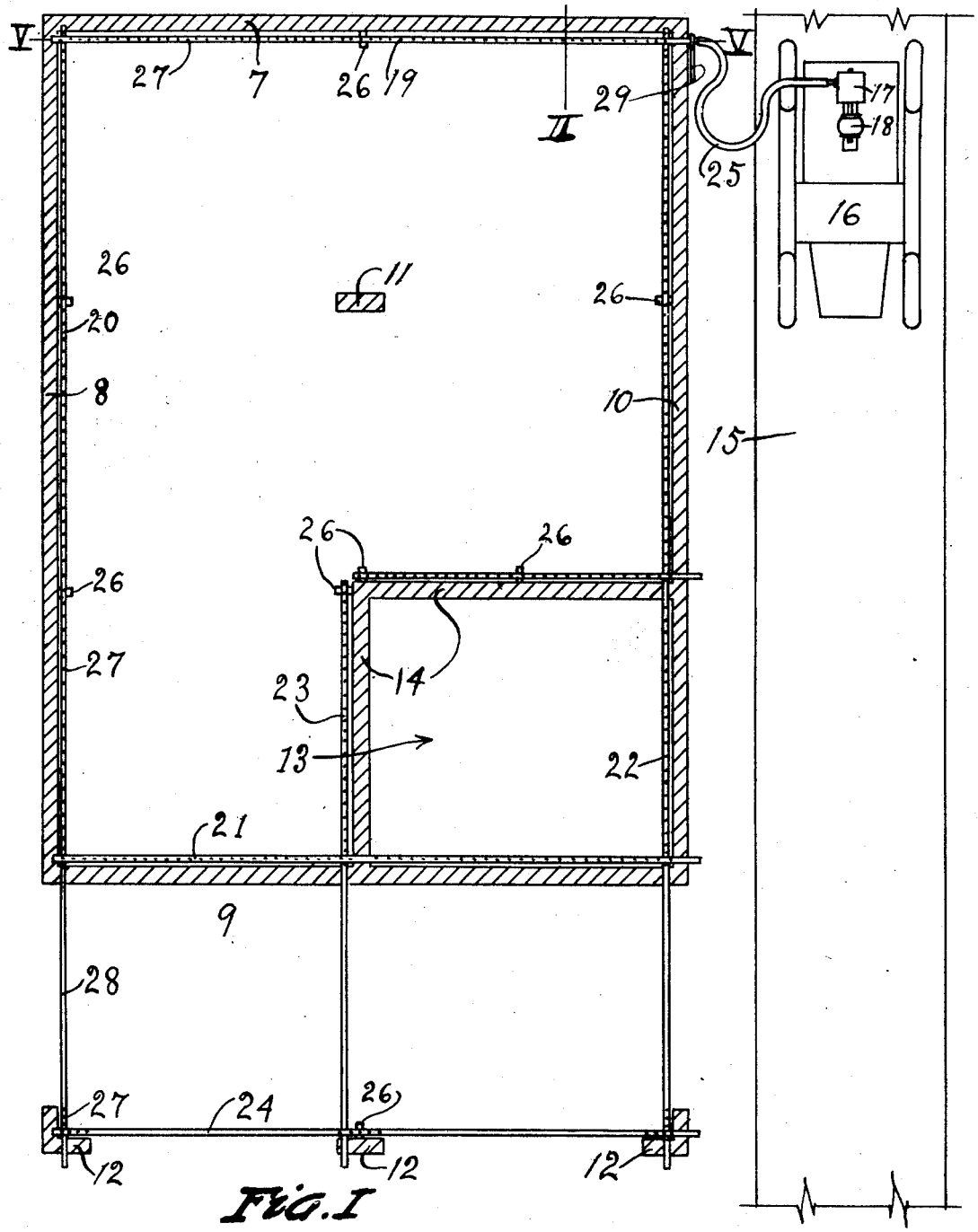
FIG. I
INVENTOR
WALTER B. HILL
by J W Weatherford
ATTORNEY.

March 10, 1931 W. B. HILL 1,795,488
MEANS FOR ERADICATING INSECTS
Filed Aug. 26, 1929   2 Sheets-Sheet 2
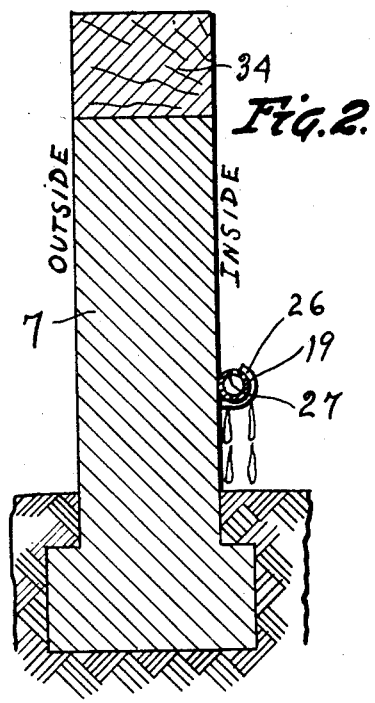
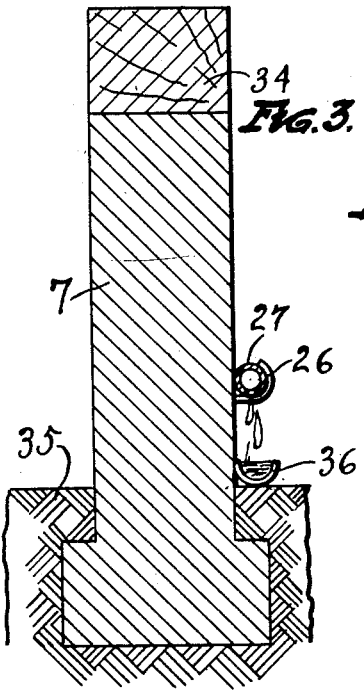
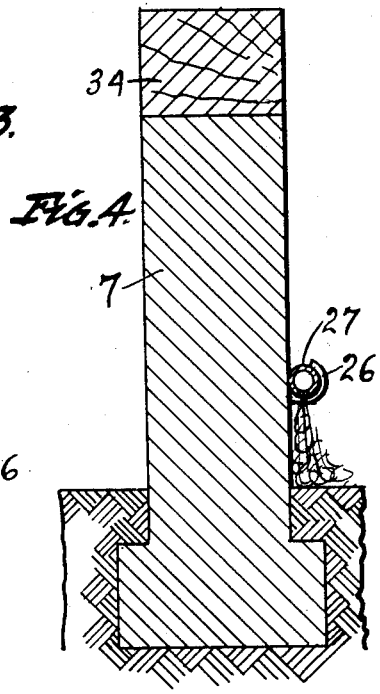
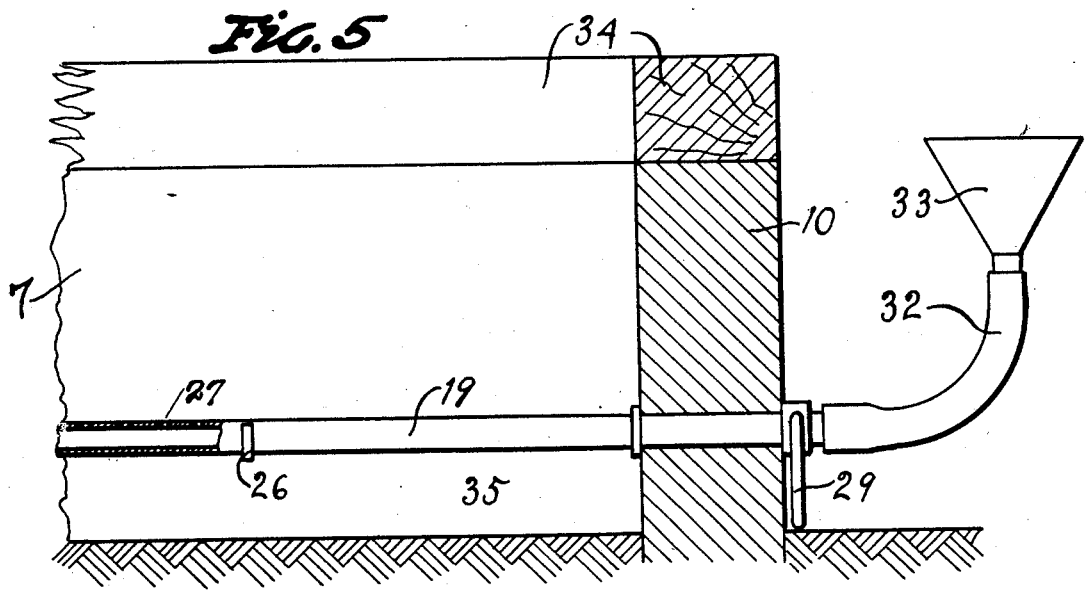
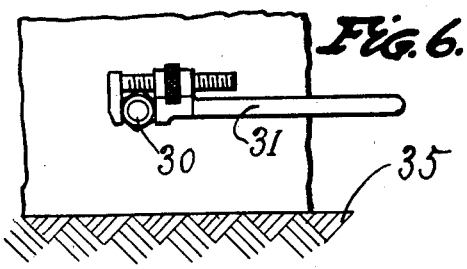
INVENTOR
WALTER B. HILL
by J. H. Weatherford
ATTORNEY.

Patented Mar. 10, 1931

1,795,488

UNITED STATES PATENT OFFICE

WALTER B. HILL, OF MEMPHIS, TENNESSEE

MEANS FOR ERADICATING INSECTS

Application filed August 26, 1929. Serial No. 388,341.

This invention relates to means and methods for driving off or exterminating insects. In the present form it is primarily directed toward the extermination of the termite, a variety of ant which is causing widespread and alarming destruction of timber in buildings and other structures. It has been found incidentally that the treatment giving the best results in the extermination of these insects also kills or drives off other insects and also drives off mice and rats as well.

The termite has made such alarming inroads and accomplished such wide spread destruction of building timber and has become such a menace, that a great deal of research has been devoted to its habits and to finding an agency which will destroy it, and certain solutions and sprays have been found which are temporarily more or less effective. It has been found too, that this particular insect works only in the dark, that it derives its food from the wood which it destroys and that in addition, it must get moisture for drinking purposes, ordinarily from other sources.

As a typical instance a termite begins his attack on the sill timbers where they rest on the foundation wall, and on the inside of the wall. Under ordinary conditions the wood of the sill is eaten away and at intervals the termite goes down the wall to the ground seeking moisture. Its entire attack is from the inside outward and ordinarily the outer shell of the timber is not broken through. It is therefore necessary in making the attack on the insect to work entirely on the inside portions of the timber. Ordinarily if the attack has not progressed too far it is possible to go in and temporarily check their progress by spraying. Unfortunately such treatment is only temporary and additional treatment should be resorted to from time to time if the building is to be safe.
The objects of the present invention are:

(a) To provide a method by which the insect may be effectually cut off from its moisture supply;

(b) To provide means particularly applicable to the carrying out of such methods;

(c) To provide means and methods which may be effectually and economically used over an extended period of time; and (d) To improve the detail of construction of such means.

The means by which the foregoing and other objects are accomplished and the manner of their accomplishment will readily be understood from the following specification on reference to the accompanying drawings, in which:

Fig. 1, is a foundation plan of a house illustrating the principal problems and conditions which are met with; and showing my device applied thereto;

Figs. 2, 3 and 4, are enlarged sections of a foundation wall with the timber sill thereon, taken as on the line II of Fig. 1, and showing three steps in the use of the preferred form of my device; Fig. 3, also showing a slight modification of the device itself;

Fig. 5, is a side elevation of a portion of the foundation wall taken as on the line V—V of Fig. 1, showing one foundation wall in section, and one of the spray pipes in place;

Fig. 6, is a fragmentary view showing the end of one of the spray pipes with a wrench thereon for rotating the same.

Referring now to the drawings in which the various parts are indicated by numerals:

7, 8, 9 and 10 are foundation walls of a building, 11 is a central pier. 12 are isolated piers spaced apart and exterior to the main portion of the building. 13 indicates a basement and 14 interior walls of this basement. 15 is a driveway, indicating usual means of access to the side and rear of the building. 16 is a motor truck. 17 indicates diagrammatically an air compressor and 18 similarly indicates a motor for actuating the same. 19, 20, 21, 22, 23 and 24 indicate pipes for supplying insecticide, both as a liquid and a spray or vapor. Each of these pipes lies along the inner surface of a foundation wall slightly above ground level and is horizontally disposed, each pipe projects beyond the wall against which it lies and extends beyond the outside of the building so that it is readily accessible for attachment of a hose 25 by which it may be connected to the compressor 17, or for filling purposes. The opposite ends of the pipes are closed and are supported either by allowing them to project into the foundation wall transverse to them, or otherwise. Brackets 26 suitably spaced are ordinarily used intermediate the length of the pipe and similar brackets may be used instead of the wall supports should it be so desired. Each of the pipes is provided with a longitudinal row of perforations 27, which extend throughout that portion of the length of the pipe which is adjacent to a wall surface, but not along other portions thereof. That portion 28 for example of the pipe 20 which lies between the inside of the foundation wall and the pier 12 is not perforated, whereas that portion of the same pipe which lies along the side of the pier 12 is perforated. The pipe 24 used along the piers 12, is only perforated where it is adjacent to such piers.

Each of the pipes is a continuous length of straight pipe and is so mounted that it may be rotated. For such purpose a permanently attached handle 29 may be used or should it be preferred a square or hexagonal boss 30 may be formed on or secured to that portion of the pipe extending beyond the wall, and a wrench 31 be used to effect the turning. 32 is a short section of hose and 33 a funnel through which liquid may be introduced into the pipe. 34 are wooden sills on the top of the foundation wall which sills indicate the beginning of the wooden superstructure of the building. 35 is the ground level.

In using the device each pipe, such as the pipe 19, is turned with the perforations upward. The hose 32 is attached to the pipe and the pipe is filled as by using the funnel 33, a measured quantity of liquid insecticide being poured into the pipe. If the amount so measured exceeds the capacity of the pipe it merely oozes upward through the perforations and runs over and around the pipe to drop on the ground adjacent the footings. I have found however, in a few instances, that the ground was so porous as to almost instantly absorb the liquid so delivered. In such cases a trough 36 may be disposed on the ground below the spray pipe and adjacent the inside of the wall into which the liquid introduced through the pipe can drop. When a sufficient amount of liquid has been put in, the pipe is rotated as shown in Fig. 3, until the perforations are downward, and is allowed to drain. The compressor is then started and the ground adjacent the wall foundation and the bottom of the wall foundation itself is thoroughly sprayed.

The pipes here shown are intended as a permanent installation, and may be put in during construction of new buildings or later installed. It is expected and intended that after installation is made the building foundations will be treated and thereafter such treatment will be repeated at recurring intervals. If the building be initially infested before treatment begins, such interval will be quite short until control of the situation is effected after which treatment need only be had at extended periods. In new and uninfested houses treatments will be at correspondingly spaced intervals.

It will be understood that the means and methods here employed are for the extermination of termites and the prevention of their attacks, at the same time it will be recognized that such treatment will also drive off other insects and even mice and rats.

It will be also noted that, when used for spraying, the perforations may be so turned as to permit spraying not only of the ground and foundation wall, but also may be turned upward and away from the wall to permit spraying of overlying portions of the structure.

Having described my invention, what I claim is:

1. Means for eradicating insects from a building, comprising the combination with a foundation wall thereof, of a pipe disposed along the inner face of the wall, and projecting there beyond, to an accessible position outside the building, said pipe having a longitudinal row of perforations, means for supporting said pipe for rotation, and means for turning said pipe to dispose said perforations in desired position, whereby said pipe may be positioned with said perforations upward to receive a charge of liquid insecticide, and said pipe may be rotated to discharge said liquid along the inner surface of said wall.

2. Means for eradicating insects from a building, comprising the combination with foundation walls thereof, of pipes horizontally disposed along the inner faces of the walls, a pipe for each of said walls, each of said pipes projecting beyond said walls to an accessible position outside said building and each of said pipes having a longitudinal row of perforations, means for supporting said pipes for rotation and means for turning said pipes, whereby said pipes may be positioned with said perforations upward to receive a charge of liquid insecticide, may be turned to discharge said liquid, and for spraying said foundations.

3. Means for eradicating insects from a building, comprising the combination with the peripheral foundation walls thereof, of pipes horizontally disposed along the inner faces of the walls, a pipe for each of said walls, each of said pipes projecting beyond said walls to an accessible position outside said building and each of said pipes having a longitudinal row of perforations, means for supporting said pipes for rotation and means for turning said pipes, whereby said pipes may be positioned with said perforations upward to receive a charge of liquid insecticide, may be turned to discharge said liquid and for spraying said foundations.

4. Means for eradicating insects from a building, comprising the combination with the peripheral foundation walls thereof, of pipes horizontally disposed along the inner faces of the walls, a pipe for each of said walls, each of said pipes having its inner end closed and projecting beyond said walls to an accessible posititon outside said building and each of said pipes having a longitudinal row of perforations, co-extensive with the adjacent exposed surface of its wall, means for supporting said pipes for rotation and means for turning said pipes, whereby said pipes may be positioned with said perforations upward to receive a charge of liquid insecticide, may be turned to discharge said liquid and for spraying said foundations.

In testimony whereof I hereunto affix my signature.

WALTER B. HILL.